US010643074B1

(12) United States Patent
McAninly et al.

(10) Patent No.: US 10,643,074 B1
(45) Date of Patent: May 5, 2020

(54) AUTOMATED VIDEO RATINGS

(71) Applicant: Amazon Technologies, Inc., Seattle, WA (US)

(72) Inventors: Emily Evon McAninly, North Bend, WA (US); Bojan Pepik, Berlin (DE); Benjamin Chung Yen Cheung, Seattle, WA (US); Vernon Germano, Bainbridge Island, WA (US); Kripa Kanchana Sivakumar, Seattle, WA (US); Eric Orme, Shoreline, WA (US); Loris Bazzani, Berlin (DE); Prateek Ramesh Chandra Shah, Issaquah, WA (US); Matthew J. Norman, Issaquah, WA (US); Michael Donoser, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 16/003,791

(22) Filed: Jun. 8, 2018

(51) Int. Cl.
| | |
|---|---|
| *G06K 9/00* | (2006.01) |
| *H04N 21/266* | (2011.01) |
| *H04N 21/234* | (2011.01) |
| *H04N 21/44* | (2011.01) |
| *G06N 20/10* | (2019.01) |
| *H04N 21/845* | (2011.01) |
| *G06K 9/62* | (2006.01) |

(52) U.S. Cl.
CPC ..... *G06K 9/00718* (2013.01); *G06K 9/00744* (2013.01); *G06K 9/627* (2013.01); *G06N 20/10* (2019.01); *H04N 21/23418* (2013.01); *H04N 21/26603* (2013.01); *H04N 21/44008* (2013.01); *H04N 21/8456* (2013.01)

(58) Field of Classification Search
None
See application file for complete search history.

(56) References Cited

U.S. PATENT DOCUMENTS

| 10,242,080 | B1* | 3/2019 | Cohen | G06F 16/55 |
|---|---|---|---|---|
| 2007/0168853 | A1 | 7/2007 | Jarman | |
| 2008/0120345 | A1 | 5/2008 | Duncombe | |
| 2008/0250328 | A1 | 10/2008 | Konttinen | |
| 2009/0234831 | A1* | 9/2009 | Ebadollahi | G06Q 30/0201 |
| 2012/0030554 | A1 | 2/2012 | Toya | |
| 2012/0276732 | A1* | 11/2012 | Lin | H01L 23/5258 |
| | | | | 438/601 |
| 2015/0142753 | A1 | 5/2015 | Soon-Shiong | |
| 2016/0381320 | A1 | 12/2016 | Mate et al. | |
| 2017/0032820 | A1 | 2/2017 | Davis, III et al. | |
| 2017/0113143 | A1 | 4/2017 | Marr et al. | |

(Continued)

OTHER PUBLICATIONS

Bing Hu, Bin Liu, Neil Zhenqiang Gong, Deguang Kong, and Hongxia Jin. 2015. Protecting Your Children from Inappropriate Content in Mobile Apps: An Automatic Maturity Rating Framework. In Proceedings of the 24th ACM International on Conference on Information and Knowledge Management (CIKM '15) (Year: 2015).*

(Continued)

*Primary Examiner* — Mekonen T Bekele
*Assistant Examiner* — Nathan J Bloom
(74) *Attorney, Agent, or Firm* — Weaver Austin Villeneuve & Sampson LLP (57) ABSTRACT

Techniques are described for a content rating system that allows for automatic assignment of maturity ratings for media content.

20 Claims, 3 Drawing Sheets

(56) References Cited

U.S. PATENT DOCUMENTS

| | | | |
|---|---|---|---|
| 2017/0289624 A1* | 10/2017 | Avila | H04N 21/4542 |
| 2017/0332113 A1 | 11/2017 | Haritaoglu et al. | |
| 2018/0098125 A1 | 4/2018 | Bender et al. | |
| 2018/0276565 A1* | 9/2018 | Brandao | G06N 20/00 |
| 2019/0027162 A1* | 1/2019 | Fukayama | G10L 25/51 |

OTHER PUBLICATIONS

P. Y. Lee, S. C. Hui and A. C. M. Fong, "Neural networks for web content filtering," in IEEE Intelligent Systems, vol. 17, No. 5, pp. 48-57, Sep.-Oct. 2002 (Year: 2002).*

Acar E, Irrgang M, Maniry D, Hopfgartner F. Detecting violent content in hollywood movies and user-generated videos. InSmart Information Systems 2015 (pp. 291-314). Springer, Cham. (Year: 2015).*

Celik, E. A. (Apr. 2017). Affective Analysis of Videos: Detecting Emotional Content in Real-Life Scenarios.Doctoral Thesis, Technische Universitat Berlin, http://dx.doi.org/10.14279/depositonce-5824 (Year: 2017).*

U.S. Appl. No. 16/003,748, filed Jun. 8, 2018, Mamdouh Mohamed Hamdy Abdu et al.

U.S. Appl. No. 16/142,487, filed Sep. 26, 2018, Germano et al.

U.S. Appl. No. 16/142,584, filed Sep. 26, 2018, Germano et al.

U.S. Office Action dated Dec. 17, 2018 issued in U.S. Appl. No. 16/003,748.

U.S. Final Office Action dated Jun. 27, 2019 issued in U.S. Appl. No. 16/003,748.

U.S. Office Action dated Oct. 9, 2019 issued in U.S. Appl. No. 16/003,748.

\* cited by examiner

AUTOMATED VIDEO RATINGS

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Media content rating systems provide classification standards for media based on subject matter such as nudity, violence, substance abuse, profanity, etc. A particular classification is typically given for an entire movie or television show. Using the Motion Picture Association of America (MPAA) film rating system as an example, a "G" (General Audiences) rating indicates that the content of the movie is suitable for all ages, a "PG" (Parental Guidance Suggested) rating indicates that some content may not be suitable for children, a "PG-13" (Parents Strongly Cautioned) rating indicates that some content of the movie may be inappropriate for children under 13, and an "R" (Restricted) rating indicates that children under 17 are not permitted without a parent. Currently, ratings are assigned based on a manual process involving a committee of people. In recent years, the rate at which media content is being published has increased substantially. As the volume of media content grows larger, manual inspection of the material is becoming impracticable.

DETAILED DESCRIPTION

This disclosure describes a content rating system that allows for automatic assignment of maturity ratings for media content. To generate a maturity rating, feature sets (e.g., digital fingerprints or vector representations) are generated for the media content. Features associated with inappropriate content are identified in the feature sets and compared to other media content for which feature sets have previously been identified. Based on similar features found in the other media content, the system automatically assigns a maturity rating for the media content. An example may be instructive. For clarity, the following description uses the terms "fingerprint" and "vector representation" to refer to feature sets. However, it will be understood that the use of these terms does not limit the scope of this disclosure to a particular type of feature set.

Figure 1:
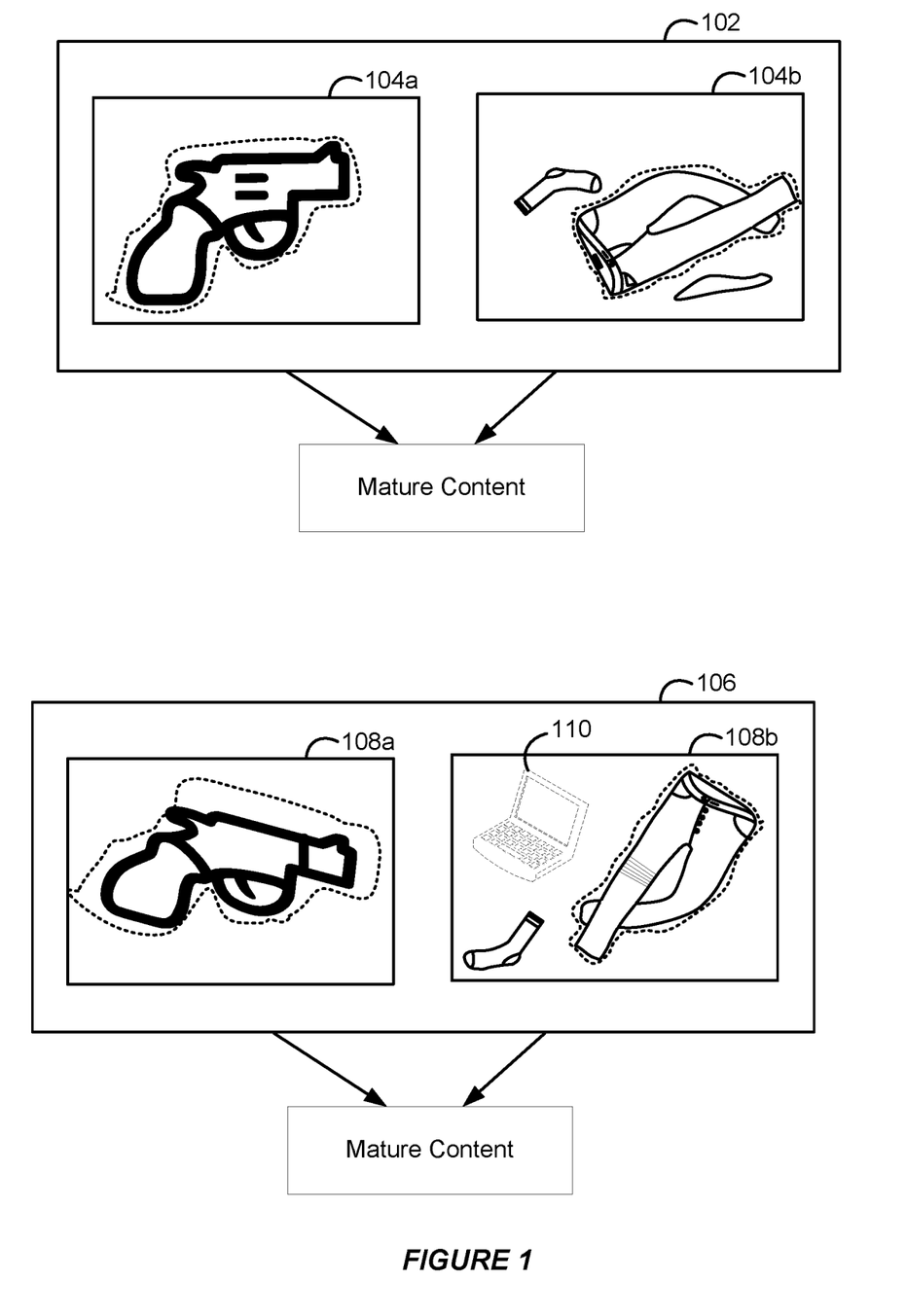
FIG. 1 illustrates an example of automatically assigning ratings for media content.

FIG. 1 illustrates an example of automatically assigning ratings for media content. In this example, media content 102 is a simplified depiction of an action movie. In this example, media content 106 is another action movie that includes similar subject matter as media content 102. If a ratings body such as the MPAA were assigning maturity ratings to both movies, they would receive the same rating.

Scene 104a is a portion of media content 102 representing a gunfight scene that includes extreme violence. Scene 104b is another portion of media content 102 representing a scene that includes nudity. In this example, media content 102 is a new movie that has yet to be assigned a maturity rating. As part of the onboarding process of including media content to include the new movie as part of a service provider's catalog of videos, a fingerprint or vector representation is generated based on the media content. The fingerprint includes features identified in the media content based on the shape of the feature. The features are identified using image recognition techniques previously trained on images including similar features. For example, the dashed line as depicted in scene 104a represents the approximate shape of a handgun, and the dashed line as depicted in scene 104b represents the approximate shape of a pair of pants laying on the ground. After generating the fingerprint for media content 102, the identified features from scenes 104a and 104b are compared to features of other media content that has been previously assigned a maturity rating. A maturity rating is determined and assigned to media content 102 using the ratings of the other media content that is most similar to media content 102.

Media content 106 is a simplified depiction of another action movie that includes scenes 108a and 108b. A fingerprint is generated for media content 106 in a similar way as media content 102. However, scene 108a includes a handgun that is a different type from the handgun in scene 104a, and scene 108b includes a different style of pants than the pants of scene 104b. Moreover, the handgun and the pants from media content 106 are both oriented in different ways from that of media content 102. Nevertheless, if the shapes of the features to be identified have been properly trained, as they have been for this example, then the same features identified for media content 102 will also be identified. As seen in scenes 108a and 108b, image recognition techniques can be applied such that the differences in type and orientation are accounted for when identifying features. The dashed line of scene 108a is the same general shape as the dashed line in 104a. Likewise, the dashed line of scene 108b is the same general shape as the dashed line in 104b. As such, after generating the fingerprint for media content 106, the identified features are compared to other media content in a similar fashion as media content 102. However, as media content 102 now includes a maturity rating, the comparison of media content 106 can also use the rating of media content 102 as a reference point. Thus, a maturity rating is determined and assigned to media content 106 that is the same as media content 102.

Scene 108b might also include objects that are unrelated to the nature of the scene as represented by the gun or the items of clothing, e.g., laptop 110. By identifying specific objects that are known to correlate with certain types of content and/or maturity ratings, the fingerprint for content 106 can be generated to include only relevant information (e.g., a representation of the pants) while excluding or ignoring such distracting objects (as represented by laptop 110 being depicted with dashed lines).

Figure 2:
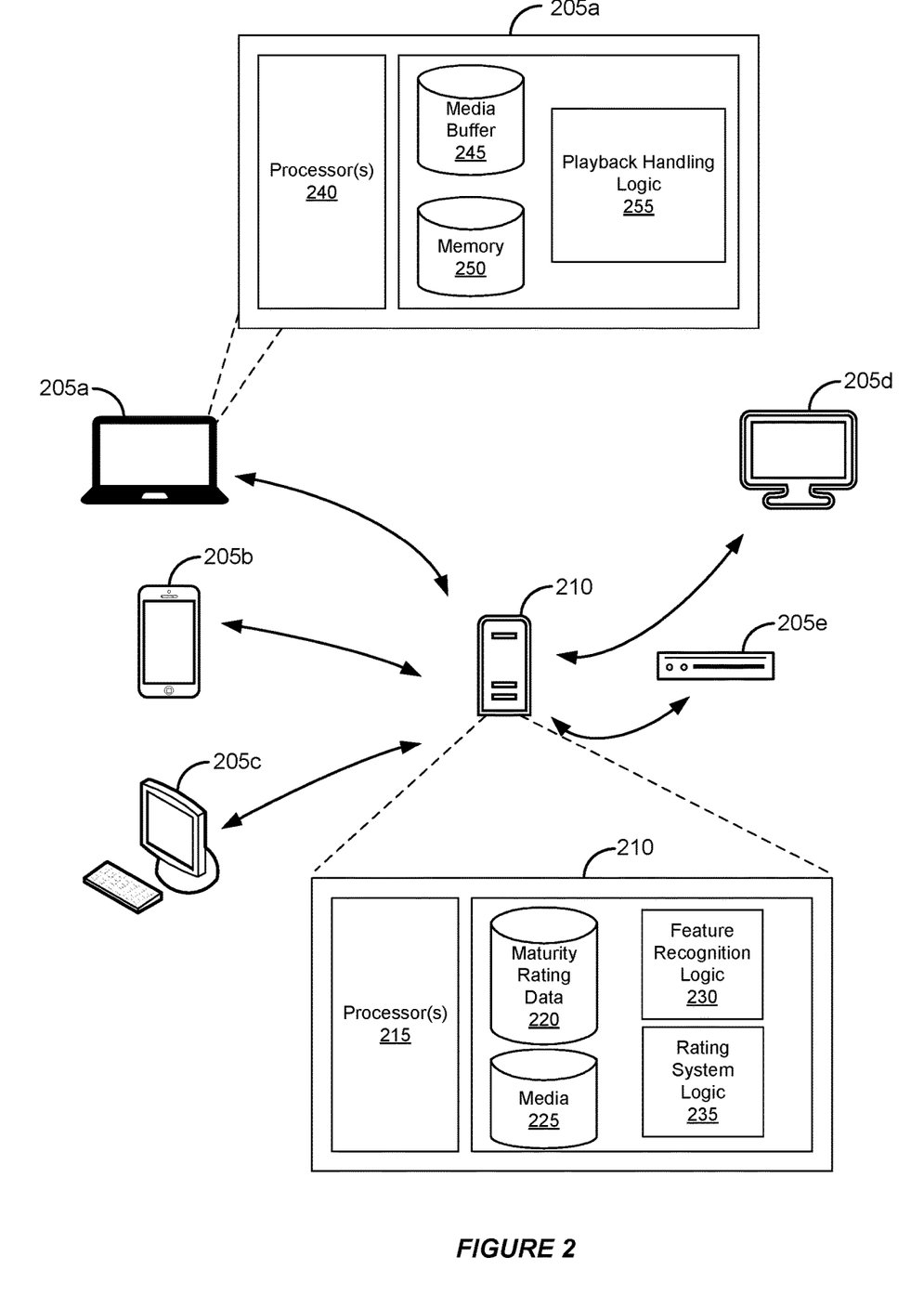
FIG. 2 illustrates an example of a computing environment for automating ratings for media content.

FIG. 2 illustrates an example of a computing environment for automating ratings for media content. The computing environment of FIG. 2 includes media server 210, which provides media content for playback on devices 205a-e. Media server 210 provides the media content in the form of fragments encoded according to a variety of playback options. Media server 210 can provide video on demand content (e.g., movies, TV shows, etc.) and live content generated and/or encoded in real time (e.g., a live sporting event, broadcast content such as a news channel, etc.). Fragments are selected by client devices 205a-e using manifest data, decoded for playback, and displayed on a display screen. Device 205a is a laptop computer, device 205b is a smartphone, device 205c is a desktop computer, device 205d is a television, and device 205e is a set-top box. Other types of devices capable of downloading or streaming video content such as tablets, wearable devices (e.g., smart watches), etc. may also be included in the computing environment.

Media server 210 provides media content from media content storage 225 and receives data for content rating from devices 205a-e. Media server 210 may be implemented using a variety of physical servers and/or virtual servers. In some implementations, media server 210 is partitioned to have separate virtual servers configured to perform different functions. In one example, one virtual server performs feature recognition techniques on media content while a second virtual server identifies similar content based on features identified using the feature recognition techniques. In some implementations, the functionality and components of media server 210 might be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content, including content providers, internet service providers (ISPs), providers of content delivery networks (CDNs), etc.

Media server 210 includes various types of logic used to automate ratings for media content. In FIG. 2, media server 210 includes feature recognition logic 230 and rating system logic 235. Media server 210 also includes one or more processors 215, memory, and other hardware for performing the disclosed techniques described herein. Media server 210 uses feature recognition logic 230 to identify recognizable features in the media content. A variety of feature recognition techniques might be used as part of feature recognition logic 230. For example, feature recognition techniques using the audio, images, subtitle transcript, or a combination thereof might be used as part of feature recognition logic 230.

Depending on the type of media, different feature recognition techniques may be utilized by media server 210. For example, feature recognition involving audio might rely on audio content recognition techniques and/or analysis of subtitles or closed caption text using natural language processing techniques to identify key words or phrases. Image recognition techniques are used by media server 210 to recognize activities in visual content that affect maturity ratings such as, for example, nudity, violence, smoking, drug use, etc. When new movies are added to a video service provider's catalog, feature recognition logic 230 can be used to generate one or more fingerprints (e.g., one or more digital representation of objects in an image such as a vector) for each scene of a movie.

Ratings system logic 235 can utilize identified features from feature recognition logic 230 to identify similar content from among the service provider's catalog. Logic 235 generates maturity ratings and stores them in a database such as maturity rating database 220. As an illustration, fingerprints associated with media content are retrieved from media content storage 225, maturity ratings from maturity rating database 220, and logic 235 correlates the ratings from previously stored fingerprints to new fingerprints of the recently added media content.

Maturity rating database 220 can be a storage device, such as a database, storing ratings associated with media content. For example, ratings associated with scenes of a movie can be stored as a ratings file in database 220. In another example, multi-jurisdictional ratings can be stored in database 220. Media server 210 can also store additional information, such as the start times and end times of each scene and its associated rating(s).

Media content storage 225 stores a variety of media content for playback on devices 205a-e. For example, episodes of shows, movies, music, digital books, videos (e.g., content uploaded by users of video streaming sites), etc. Additionally, media content storage 225 can store metadata associated with media content, such as manifests, subtitles, etc.

Client devices 205a-e can also include various types of logic used to implement a decoder to decode encoded media content, store the media content in media content buffer 245, and play back the media content using playback handling logic 255. Client device 205a includes one or more processors 240, memory 250, and other hardware components or circuits to decode and play back the encoded media content. For example, processor(s) 240 of client device 205a can execute instructions from a maturity rating metadata file stored in memory 250 to identify ratings for movies or TV shows.

It should be noted that, despite references to particular computing paradigms and software tools herein, the computer program product and the computer program instructions on which various implementations disclosed herein are based may correspond to any of a wide variety of programming languages, software tools, and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 3:
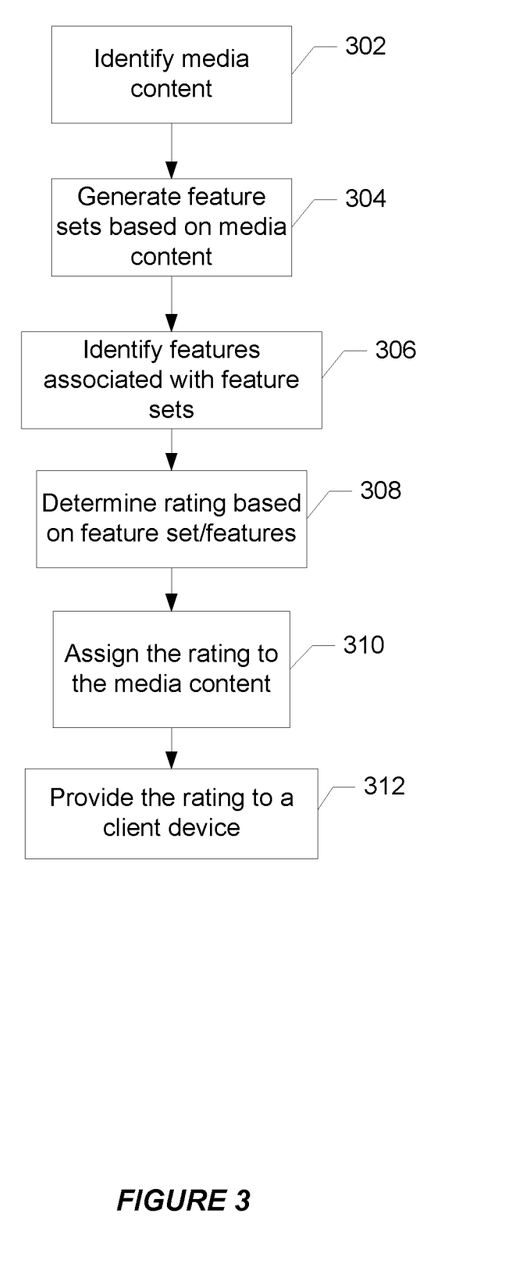
FIG. 3 is a flowchart illustrating automation of ratings for media content.

A specific implementation will now be described with reference to the computing environment of FIG. 2 and the flow diagram of FIG. 3. Media server 210 identifies media content that is to be assigned a maturity rating (302). To start the process of automatically assigning maturity ratings, a training set of media content might be used to train the fingerprints as well as the classification determinations of the media server. In this case, the media content identified by the media server would be the training set of media content. The size of the training set can vary but should be large enough to allow for a variety of views and perspectives of the features to be identified such that accurate classifications can be made. The initial size of a training set of media content might be tens or hundreds, or even thousands to hundreds of thousands of movies and TV shows or individual scenes thereof. The size of the training set of media content might increase as more media content is processed and assigned ratings. Alternatively, the training set of media content can be manually curated to remove those movies and/or TV shows that might be causing inaccurate ratings to be assigned to newly classified media content.

After a training set of media content has been established, the media content identified as part of block 302 might be new media content that is to be added to a service provider's media content catalog. As will be appreciated, the techniques enabled by the present disclosure may be particular well suited for assigning ratings to media content for regions in which no regulatory scheme is in place, for confirmation that media content has not been improperly classified, or for establishing age appropriateness where video content has not been certified by an official ratings body (e.g., independent movies published directly through the service provider).

After identifying the media content, one or more fingerprints are generated based on the identified media content (304), and features associated with the fingerprint are identified (306). In some implementations, a fingerprint for each frame of a video is generated. Each frame is provided as input to a neural network (e.g., ImageNet) trained to identify features associated with the fingerprint.

According to some implementations, a raw image is provided as a number of pixels with a width and height. Each pixel has different values for each of the color channels, e.g., Red, Green, and Blue (RGB). One or more convolution filters are applied as layers to the frame. The number of filters can vary, as well as the type of filter applied. As more layers are applied to a frame, the more the layers tend to capture more things like objects, while shallower layers tend to capture local details. The convolution filters allow for various degrees of detail to be defined for the feature to be identified. As more layers are applied to a frame, the more specific aspects of that particular feature will be captured. However, it might be particularly advantageous to capture that level of detail. For example, if the system is being trained to identify chairs, enough layers could be applied such that a "chair" is only identified for a particular type of chair, e.g., a folding chair. However, one or more layers might be excluded in order to more accurately identify chairs according to a more general shape of a chair. The model will adapt and refine the shape of the object based on whether accurate identifications of that object are being made. With each additional image that is processed, the parameters of the shape of the object can be updated to improve accuracy.

In some implementations, the identified features include weights indicating the degree of certainty, e.g., a confidence level, for the feature identified. In a simple example, the features to be identified include a bicycle, a car, and a motorcycle. The training set of images includes images of bicycles, cars, and motorcycles, depicted from various perspectives, as well as a variety of other objects. For each image, the media server determines whether the shape of a bicycle, a car, or a motorcycle is in the image. Weights can be assigned based on the certainty of the accuracy of the prediction. For example, if the image includes an unusual bicycle that includes a motor, the bicycle will be assigned the greatest weight, followed by the motorcycle, with little weight being assigned to the car.

It should be noted that while the above-mentioned example refers to frames of a video. A portion of the frame can also be used as the initial input, for example, blocks of pixels with the following dimensions 32×32, 64×64, 96×96, 224×224, 384×384, 512×512, etc. In addition, fingerprints might be generated for each frame of a movie, but fingerprints might also be generated according to a sampling technique that omits certain frames from having a fingerprint generated. For example, there may be a fixed sampling rate such as generating a fingerprint for every other frame of a movie. It should be noted that sampling rate is configurable such that any other sampling rate might be used, for example, one frame each second, one frame from every scene, etc.

While fingerprints can be generated on a frame-by-frame basis, they can also be generated for other amounts of media content. In one class of implementations, fingerprints are generated on a fragment-by-fragment basis. For example, fingerprints are generated for each two second chunk of encoded media content. In another class of implementations, fingerprints are generated for longer lengths of time, either by a fixed duration or a scene-by-scene basis, a collection of scenes, etc. In contrast to the frame-based fingerprints, fingerprints generated using these techniques can capture features associated with motion (e.g., an action scene that might include excessive violence).

In some implementations, an aggregate fingerprint is generated for the entire movie or TV show. In some implementations, the aggregate fingerprint is generated based on max pooling the values from the individual fingerprints. Max pooling includes taking the greatest value from each fingerprint to generate a fingerprint the maximum values from each individual frame. The size of the aggregate fingerprint can vary, and in one class of implementations, the aggregate fingerprint is a vector of 4000 values. Other aggregation techniques may also be used to generate an aggregate fingerprint. For example, temporal average pooling, pooling, bag-of-words-based approaches, approximate nearest fingerprint, etc.

Other techniques may also be used to generate fingerprints and identify features. For example, edge detection corner detection, scale-invariant feature transforms, optical flow recognition, template matching techniques, Hough transforms, etc. In one example, each image of a movie is converted using a grayscale filter. Edge detection techniques are used to outline objects in the image and the shape of the object is converted into a vector. Other types of filters may be used to highlight various things about an image, such as a sharp transition from one pixel intensity to another pixel intensity (likely an indication of an edge of an object). The pixel values of the pixels within the identified edges can then be averaged to identify the object within those edges. Once a suitable representation of the object is identified, the object can be compared to a library of known objects to see if it is similar in amount and distribution of different colors, shape of outline, etc. In another example, video frames are segmented into blocks of pixels (e.g., 64×64), computing an average color, and combining this information to characterize some duration (e.g., 1-30 seconds) of the video. Another kind of video image recognition technique might be used to identify scene changes in the content (e.g., by comparing changes in successive frames or detecting black frames). In order to accurately identify features across different media content, machine learning techniques can be used to refine and build upon the above-mentioned techniques. Optical flow recognition techniques can also be used which include identifying patterns of apparent motion of objects and edges in a scene caused by the relative motion as perceived by the viewer. In other implementations, imperfect matches of objects can be used by implementing a voting procedure described further below in the discussion of the determination of ratings. And as mentioned above, the ability to recognize specific objects allows for the exclusion of irrelevant objects when generating fingerprints and/or determining maturity ratings, e.g., a military tank is known to correspond to violence while a hat typically has nothing to do with the maturity level of the content.

In addition to fingerprints being generated based on images, fingerprints can also be generated based on audio associated with the video and/or the text (e.g., subtitles) associated with the movie. Natural language processing techniques can be applied to text associated with media content. For example, using an audio transcript or subtitles associated with the media content, text can be extracted and tokenized using natural language processing techniques for comparison with other subtitles and/or information known to correlate with certain classifications of content. A semantic parser can be used to associate meaning with the extracted tokens and mapped to known phrases associated with certain types features (e.g., gunfire, bad language, etc.). Sentiment analysis techniques may further be used to derive attitudes of characters in a movie, with more negative opinions possibly indicating that the scenes include features associated with certain types content. In some implementations, a raw transcript of the audio is processed such that the timecodes are removed leaving a stream of dialogue and explanatory scene text. Features can be identified on a word-by-word or basis, bi-grams basis, or any other n-gram variation. In some cases, as words are skipped, they are concatenated on either side of the skipped word, and a weight is generated indicating whether a particular feature has been identified. A feature in this case can refer to foul language or a scene with text description such as "gun fire." An aggregate text fingerprint might be a sum of all the weights for the different features and an indication of whether the weights exceed certain thresholds. This includes techniques using Mel Frequency Cepstrum Coefficients (MFCC) to generate audio fingerprints. Audio fingerprints represent the power spectrum of an audio signal for a short period of time (e.g., 25 ms). In one example, hash values may be calculated using the audio samples associated with spectrogram peaks, resulting in a constellation of temporally localized data points. A variety of other suitable techniques are known or within the capabilities of those skilled in the art.

Returning to FIG. 3, the media server determines a content rating (308) based on the features on the identified features of step 306. In some implementations, a rating system is trained on the fingerprints generated in step 306. The rating is assigned to the media content (310) and provided to the client (312). Rating systems attempt to classify media content according to the subject matter that might be considered sensitive to the audience. For example, sex, violence, substance abuse, profanity, religious and political symbolism, etc. Service providers of movie content typically serve a global audience across many different countries. Different geographic regions may have their own ratings body governing ratings of media content. As the rating systems of a particular body will most accurately reflect the cultural views of a particular audience in a country, a rating that most closely represents the beliefs of that country can be achieved. Ratings are typically applied according to classifications based on age appropriateness. In addition to age appropriateness, there are also aspects of obscenity law and other regional requirements such as displays of political or religious symbolism that impact a video's classification.

While the automated rating system can be trained using one rating system, it may be useful to train a variety of rating systems on the fingerprints. Examples of rating systems include any from the major motion picture and television ratings systems bodies such as the Motion Picture Association of America in the United States, British Board of Film Classification (BBFC) in Great Britain and Freiwillige Selbstkontrolle der Filmwirtschaft (Voluntary Self-Regulation of the Film Industry, FSK) in Germany, etc. In addition, internal rating systems created by the service provider can be used along with or in place one or more other ratings systems. An internal rating system can be as simple as a binary classification system that assigns a rating that indicates either the media content is appropriate for a general audience or it is not. In addition, more complex multi-level rating systems are also envisioned allowing for assignment of ratings at a more granular level.

An internal rating system may be particularly useful for unrated content or improperly classified content, which could lead to risk exposure. In addition, the internal rating system can provide guidance for age appropriateness for media content that has not been previously assigned a rating. For example, movies originating from independent filmmakers, or countries that do not have a governing body with an established rating system. A further benefit of training multiple systems on the fingerprints is that it allows for multiple ratings across jurisdictions to be assigned to new media content as it is added. For example, a new movie might be deemed as having mature content inappropriate to children under the age of 13 according to the MPAA, whereas under the BBFC, the new movie might be deemed appropriate for all audiences.

In some implementations, the automated rating system is trained using a training set of images that are processed with manual input from an administrator to confirm whether a classification was accurate. In other implementations, an administrator is not involved in the confirmation of accuracy process. For example, the automated rating system might be trained using a training set of images that are processed with feedback based on the classification assigned by a ratings body. For example, if the MPAA has classified an action movie as rated R, then the classifier determines whether its classification is accurate based on whether it also classified the action movie as rated R. In some implementations, ratings can be determined for individual scenes (e.g., a movie is made up of a collection of G-rated scenes and one PG-13 rated scene) or for an entire movie.

When receiving a new movie to assign a rating, the media server can use one or more techniques to identify the movies that are most similar from the library of the service provider. In one class of implementations, a nearest neighbor algorithm is used. Previously classified media content are separated into several categories (e.g., ratings such as G, PG, PG-13, R) to predict the classification of new media content. A comparison of the new media is made in relation to the already stored media content, and the media content will be assigned a rating based on a majority vote of its neighbors. The media content will be assigned the rating that is the most common among its k nearest neighbors. The k value is configurable, and the choice of the value for k may depend upon the size of the media library and the quality of the fingerprints. Larger values of k reduce the effect of the noise on the classification but can make the boundaries between classes less distinct (e.g., easier to misclassify a PG-13 movie that is mistakenly rated R). In one approach, k is set to a value of 1, and the rating of the nearest video is assigned to the new media content. The accuracy of the algorithm can be degraded by the presence of noisy or irrelevant features. Thus, in some implementations, weights are assigned to neighbors with more weight being assigned to those neighbors that are nearest. For example, if k is set to 3, the nearest video has the greatest amount of weight assigned, the next video has less weight assigned than the nearest video, and the furthest of the 3 nearest videos has the least amount of weight assigned.

In some implementations, the different types of fingerprints (e.g., video, audio, and text) are used in combination to determine the rating of the media content. In some cases, the ratings determination might be facilitated by additional inputs as the different types of fingerprints (e.g., video, audio, and text) discussed above or others (e.g., feedback provided from users). For example, the user may provide feedback in the form of a rating that they believe a scene or entire movie should be. The feedback may be provided during playback of the video or at another time or through a different communication channel (e.g., through a chat interface, e-mail, etc.).

In some implementations, a combination of the different types of fingerprints are used to determine the rating of the media content. In some cases, separate fingerprints associated with a respective type (e.g., audio, video, text) are compared with each type of fingerprint associated with the other media content in the catalog. In other cases, a single fingerprint based on the audio, video, and text fingerprints is compared with a single fingerprint for other media content. In some implementations, different weights are assigned to the different types of fingerprints. For example, more weight might be given to the text or audio fingerprint when calculating a similarity based on profanity between media content. In other implementations, more detailed information may be assigned to the rating that is determined. For example, if a movie is assigned an R rating, the reason for the R rating may also be provided (e.g., This movie is rated R because of scenes including extreme violence).

In some implementations, the above-mentioned techniques are applied to live streaming content such as a live feed, sports game, or a news broadcast. Fingerprints for live content cannot be generated ahead of time like it can be with video on demand, so fingerprints are generated while the live content is being generated. Different ways to segment the live fingerprints can be used. For example, a rolling 30 second window, each two second fragment, from each commercial break, etc. The rating for the live content can be periodically updated as the live content is being streamed. There is typically a certain amount of time between the playhead of the client and the live playhead at the media server where the live content is being generated (e.g., 2-15 seconds). As such, the updated ratings may be provided to the client device prior to the most recent content being displayed at the client device. For example, a news channel may switch to a live feed of a criminal in a shootout with police. 15 seconds into the live feed, the police start shooting, but prior to this shootout being displayed on the client device, the disclosed techniques can determine that mature content is being displayed, and a warning can be provided to the client device prior to displaying the mature content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving first media content;
generating a first feature set based on the first media content, wherein generating the first feature set includes generating a feature subset for each of a plurality of different temporal portions of the first media content, excluding irrelevant values from the feature subsets that are unrelated to maturity levels of the first media content, and aggregating the feature subsets to generate the first feature set by selecting a greatest value from each of the feature subsets;
determining that a second feature set of a plurality of feature sets is similar to the first feature set;
identifying a first maturity rating associated with the second feature set; and
assigning the first maturity rating to the first media content.

2. The method of claim 1, wherein generating the first feature set based on the first media content includes generating one or more of a first value based on video associated with the first media content, a second value based on audio associated with the first media content, or a third value based on subtitles associated with the first media content.

3. The method of claim 1, wherein the first maturity rating corresponds to a first category of a plurality of pre-defined categories of a ratings system for videos or television.

4. The method of claim 1, wherein the plurality of feature sets are generated based on training media content.

5. The method of claim 1, further comprising determining that a third feature set of the plurality of feature sets is similar to the first feature set, wherein the first maturity rating is associated with both the second feature set and the third feature set.

6. The method of claim 1, wherein the first media content is live content, and wherein the first feature set represents a first portion of the live content, the method further comprising:
generating a third feature set based on a second portion of the live content subsequent to the first portion of the live content;
determining that a fourth feature set of the plurality of feature sets is similar to the third feature set;
identifying a second maturity rating associated with the fourth feature set; and
assigning the second maturity rating to the second portion of the live content.

7. The method of claim 1, further comprising identifying a second maturity rating associated with the second feature set and assigning the second maturity rating to the first media content, the first maturity rating being associated with a first ratings system and the second maturity rating being associated with a second ratings system different from the first ratings system.

8. A system, comprising one or more computing devices configured to:
receive first media content;
generate a first feature set based on the first media content, wherein the one or more computing devices are configured to generate the first feature set by generating a feature subset for each of a plurality of different temporal portions of the first media content, excluding irrelevant values from the feature subsets that are unrelated to maturity levels of the first media content, and aggregating the feature subsets to generate the first feature set by selecting a greatest value from each of the feature subsets;

determine that a second feature set of a plurality of feature sets is similar to the first feature set;

identify a first maturity rating associated with the second feature set; and assign the first maturity rating to the first media content.

9. The system of claim 8, wherein the one or more computing devices are configured to generate the first feature set based on the first media content by generating one or more of a first value based on video associated with the first media content, a second value based on audio associated with the first media content, or a third value based on subtitles associated with the first media content.

10. The system of claim 8, wherein the first maturity rating corresponds to a first category of a plurality of pre-defined categories of a ratings system for videos or television.

11. The system of claim 8, wherein the one or more computing devices are configured to generate the plurality of feature sets based on training media content.

12. The system of claim 8, wherein the one or more computing devices are further configured to determine that a third feature set of the plurality of feature sets is similar to the first feature set, and wherein the first maturity rating is associated with both the second feature set and the third feature set.

13. The system of claim 8, wherein the first media content is live content, wherein the first feature set represents a first portion of the live content, and wherein the one or more computing devices are further configured to:

generate a third feature set based on a second portion of the live content subsequent to the first portion of the live content;

determine that a fourth feature set of the plurality of feature sets is similar to the third feature set;

identify a second maturity rating associated with the fourth feature set; and assign the second maturity rating to the second portion of the live content.

14. The system of claim 8, wherein the one or more computing devices are further configured to identify a second maturity rating associated with the second feature set and assign the second maturity rating to the first media content, the first maturity rating being associated with a first ratings system and the second maturity rating being associated with a second ratings system different from the first ratings system.

15. A computer program product, comprising one or more non-transitory computer-readable media having computer program instructions stored therein, the computer program instructions being configured such that, when executed by one or more computing devices, the computer program instructions cause the one or more computing devices to:

receive first media content;

generate a first feature set based on the first media content, wherein the computer program instructions are configured to cause the one or more computing devices to generate the first feature set by generating a feature subset for each of a plurality of different temporal portions of the first media content, excluding irrelevant values from the feature subsets that are unrelated to maturity levels of the first media content, and aggregating the feature subsets to generate the first feature set by selecting a greatest value from each of the feature subsets;

determine that a second feature set of a plurality of feature sets is similar to the first feature set;

identify a first maturity rating associated with the second feature set; and assign the first maturity rating to the first media content.

16. The method of claim 1, wherein each of the plurality of feature sets corresponds to previously classified media content, wherein the previously classified media content is separated into a plurality of groups based on corresponding classifications, wherein determining that the second feature set is similar to the first feature set includes identifying k feature sets included among the plurality of feature sets that are most similar to the first feature set, and wherein identifying the first maturity rating includes identifying the classification most common among the previously classified media content corresponding to the k feature sets.

17. The system of claim 8, wherein each of the plurality of feature sets corresponds to previously classified media content, wherein the previously classified media content is separated into a plurality of groups based on corresponding classifications, wherein the one or more computing devices are configured to determine that the second feature set is similar to the first feature set by identifying k feature sets included among the plurality of feature sets that are most similar to the first feature set, and wherein the one or more computing devices are configured to identify the first maturity rating by identifying the classification most common among the previously classified media content corresponding to the k feature sets.

18. The computer program product of claim 15, wherein each of the plurality of feature sets corresponds to previously classified media content, wherein the previously classified media content is separated into a plurality of groups based on corresponding classifications, wherein the computer program instructions are configured to cause the one or more computing devices to determine that the second feature set is similar to the first feature set by identifying k feature sets included among the plurality of feature sets that are most similar to the first feature set, and wherein the computer program instructions are configured to cause the one or more computing devices to identify the first maturity rating by identifying the classification most common among the previously classified media content corresponding to the k feature sets.

19. The computer program product of claim 15, wherein the computer program instructions are configured to cause the one or more computing devices to generate the first feature set based on the first media content by generating one or more of a first value based on video associated with the first media content, a second value based on audio associated with the first media content, or a third value based on subtitles associated with the first media content.

20. The computer program product of claim 15, wherein the first maturity rating corresponds to a first category of a plurality of pre-defined categories of a ratings system for videos or television.

* * * * *